United States Patent [19]

Gilleland et al.

[11] 4,084,074
[45] Apr. 11, 1978

[54] WIRE ELECTRODE PROTECTION SYSTEM FOR ELECTRICAL DISCHARGE MACHINING

[75] Inventors: Randall C. Gilleland, Statesville; Frank P. Rietveld, Matthews, both of N.C.

[73] Assignee: Colt Industries Operating Corporation, New York, N.Y.

[21] Appl. No.: 534,291

[22] Filed: Dec. 19, 1974

[51] Int. Cl.² .............................................. B23P 1/08
[52] U.S. Cl. .................................................. 219/69 W
[58] Field of Search ............... 219/69 V, 69 R, 69 M, 219/69 G, 69 E, 69 W, 69 C

[56] References Cited

U.S. PATENT DOCUMENTS

| 2,974,216 | 3/1961 | Inoue | 219/69 V |
| 3,636,296 | 1/1972 | Semin | 219/69 V |
| 3,822,374 | 7/1974 | Ullmann et al. | 219/69 V |
| 3,849,624 | 11/1974 | Dulebohn | 219/69 V |

Primary Examiner—Bruce A. Reynolds
Attorney, Agent, or Firm—Harry R. Dumont

[57] ABSTRACT

A wire feed protection system for an electrical discharge machining apparatus and machine tool. The workpiece is supported for movement along two coordinate axes in the "X" and "Y" direction through electrically controlled stepping motors in a manner which is well known to the art. The electrode is of a wire or band configuration and is so supported, guided, and driven that the cutting portion of the electrode which is aligned with the workpiece before and during cutting remains properly oriented and travels without bend or distortion in its path. When the wire breaks, bows or otherwise is caused to lose tension, a switch is operated to interrupt machining power pulses being supplied to the machining gap. For this purpose, a switch is located at one or more critical and predetermined locations in the wire electrode path, with the switch actuator in each case in engagement with the wire during transversal.

4 Claims, 6 Drawing Figures

WIRE ELECTRODE PROTECTION SYSTEM FOR ELECTRICAL DISCHARGE MACHINING

REFERENCE TO RELATED APPLICATIONS

This application is related to the following copending applications, all of common ownership with the present application:

| Serial No. | Filing Date | Title |
|---|---|---|
| 532,200 | 12-12-74 | Wire Electrode Feed System For Electrical Discharge Machining<br>Inventor: Frank P. Rietveld |
| 532,199 | 12-12-74 | Wire Electrode Feed And Cut-Off System For Electrical Discharge Machining<br>Inventor: Frank P. Rietveld |
| 534,292 | 12-19-74 | Electronic Alignment System For A Wire Electrode<br>Inventors: Randall C. Gilleland and Frank P. Rietveld |
| 551,957 | 2-21-75 | Servo Feed System For A Wire Electrode Type Electrical Discharge Machining Apparatus<br>Inventors: Oliver A. Bell, Jr. and Randall C. Gilleland |
| 543,989 | 1-27-75 | Electrical Discharge Machining Device For Cutting With Wire Electrode<br>Inventor: Frank P. Rietveld |
| 555,821 | 3- 6-75 | Constant Wire Feed Control System For Electrical Discharge Machining<br>Inventors: Oliver A. Bell, Jr. and Randall C. Gilleland |
| 545,929 | 1-31-75 | Electrical Discharge Machining Device For Taper Cutting With Wire Electrode<br>Inventor: Frank P. Rietveld |
| 567,345 | 4-11-75 | Servo Feed System For Through Hole Cutting For Electrical Discharge Machining Apparatus<br>Inventors: Oliver A. Bell, Jr. and Randall C. Gilleland |
| 588,060 | 6-18-75 | Servo Feed System For Through Hole Machining For Electrical Discharge Machining Apparatus<br>Inventors: Oliver A. Bell, Jr. and Randall C. Gilleland |
| 583,794 | 6- 4-75 | Programmable Current Control System For Wire Electrode Electrical Discharge Machining Apparatus<br>Inventors: Oliver A. Bell, Jr. and Randall C. Gilleland |

BACKGROUND OF THE INVENTION

The present invention relates to an improved wire feed system for electrical discharge machining. The system in many cases eliminates the necessity of relatively expensive three dimensional electrical discharge machining electrodes that must be machined by precision machining operations, which greatly add to the cost of the operation. The wire feed system by its use of a precisely driven and guided wire electrode makes possible the generation of very small radii in intricate shapes. As the wire electrode process has expanded to press tooling, extrusion dies, powdered metal dies and precision prototype parts, it became necessary to improve the machine tool head and to provide a wire feed system design which is specifically made for wire feed and operable to accommodate the necessary standards of reliability and performance. It has been necessary to completely redesign the head assembly of the standard EDM machine tool to provide for the wire feed system.

It will be understood that the present invention as it relates to the machine tool portion of the EDM apparatus is used in conjunction with an EDM power supply which comprises a pulse generator that provides machining power pulses to the machining gap. The machining power pulses are of precisely controllable on-off time and current magnitude therefore to control the rate of machining, the finish of the workpiece and the degree of the overcut.

In the use of a wire electrode, the level at which machining is accomplished is typically of a high voltage level, which may range as much as 300 volts. A typical range of machining current would be 15 amperes of cutting current either infinitely variable or with as many as ten steps of current limiting provided.

It will be understood that the tables on a typical two axis contouring model, such as is shown in the drawings, would be capable of performing both straight line motions and continuous path contouring. Any of a number of commercial numerical tape control units are available for providing this control. One example of such a unit is the numerical tape control unit manufactured by the Superior Electric Company of Bristol, Connecticut.

The prior art has shown a variety of wire and band electrode feed arrangements which are adapted to provide the type of machining with which we are currently concerned. However, certain difficulties have arisen in the use of such systems. Among the major problems are the requirement for causing a length of wire to pass with a constant velocity through the machining gap region. This constant velocity movement is necessary since the cross section of the wire changes during machining. Unless the movement of the wire through the gap is maintained at a constant velocity, the machining slot would be of a varying width. This condition could not be tolerated in any precision machining operation.

An example of an early type of band electrode machining arrangement is shown and described in U.S. Pat. No. 2,903,557 issued on Sept. 8, 1959 to V. E. Matulaitis for "Arc Machining With Band Electrode". In that patent, the problem of maintaining a constant width band or wire electrode was handled by providing a feed of the electrode with a velocity that was regulated in accordance with a feed-back signal representative of average current through the gap. The system for guiding and driving the band electrode consisted of a pair of reels, that is, a supply reel and a windup reel. In the two reel system, it was exceedingly difficult to avoid electrode bend or bowing in the wire between the two reels.

Other prior art arrangements are shown and described in U.S. Pat. No. 3,731,043 issued on May 1, 1973 to Ullmann et al. for "Digital Circuit for an Eroding Machine" and U.S. Pat. No. 3,636,296 issued on Jan. 18, 1972 to G. G. Semin for "Arrangement for Stopping Automatically an Electric Spark Eroding Machine Having Its Work-Performing Electrode Tool in the Shape of a Wire or Band". Both of these patents show systems similar to the Matulaitis patent in that the wire or band electrode at its ends is supported and unreeled from spools and reeled onto spools. Such an arrangement has in it the difficulty of providing frequent and unpredictable bends with accompanying changes in velocity of the electrode band or wire such that the gap being machined varies in thickness. Accordingly, the overcut and the dimensions of the machined article cannot ordinarily be maintained within the necessary limits.

An additional shortcoming not overcome by the prior art is the problem of maintaining that section of the wire electrode which is doing the cutting, that is in the region proximate to the workpiece, in a fixed, properly oriented path to achieve the required cut. Typically, if the control exercised is a two dimensional control with an X and a Y axis table, it would be necessary to maintain the wire with its operative cutting length perpendicular to the table carrying the workpiece or, alternately stated, perpendicular to the plane in which the workpiece is lying.

The invention of Applicant with respect to the alignment and support of the wire in this critical region includes a novel and highly effective arrangement between two orthogonally arrayed guide rollers, adjustable along their axes of rotation, such that this precise alignment is not only obtainable from the very beginning of the cutting operation but is continued throughout the cutting cycle. As shown in the aforementioned U.S. Pat. No. 3,731,043, the wire in the critical cutting region is maintained between simple pins. In the aforementioned U.S. Pat. No. 3,636,926, the wire is supported between parallel axis rollers so that the major benefits and advantages of a system like Applicants' are not possible.

SUMMARY OF THE INVENTION

The present invention thus provides an improved driving and feeding arrangement for a wire or band electrode. The system is capable of driving the electrode with a constant velocity during the machining operation. Just as importantly, the electrode is precisely alignable and maintainable in position, that is, the operative cutting length of it is properly aligned to the workpiece, so that the proper linear relationship between the wire electrode and the workpiece can be held. In the event the wire tension is lost through breakage, bowing, or otherwise, a sensing switch or switches will be actuated to interrupt the machining power pulses and prevent damage to the workpiece until the condition can be corrected.

BRIEF DESCRIPTION OF THE DRAWINGS

The present invention will be described in the appended drawings, with like numerals being assigned to like parts as they may appear throughout the several views, and in which.

DETAILED DESCRIPTION OF THE PREFERRED EMBODIMENT

Figure 1:
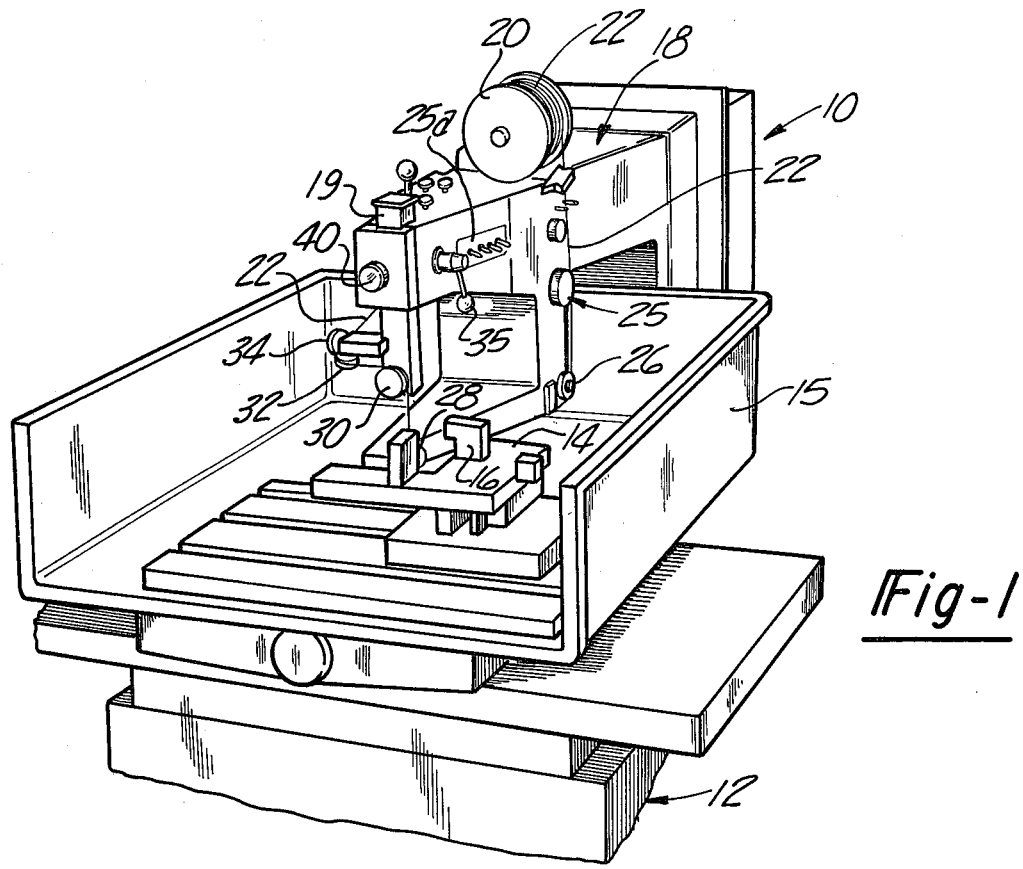
FIG. 1 is a partial front perspective view of a machine tool for electrical discharge machining incorporating the present invention.

With more particular reference to FIG. 1, there is shown a machine tool, indicated generally by the numeral 10. The EDM power supply which is associated with the machine tool 10 is not shown except in a block diagrammatic form in FIG. 3. It will be understood that the power supply may be any of a number of commercial independent pulse generators or relaxation oscillator type pulse generators as are well known in the EDM art.

The machine tool 10 includes a base 12, which typically has built into it a dielectric fluid reservoir and dielectric fluid temperature control unit for handling the dielectric fluid used in the EDM operation. The dielectric fluid may be either an ionized water supply or, alternately, kerosene or a like light cutting oil. Throughout the cutting operation, a stream of dielectric fluid is continuously directed at the electrode wire and the workpiece to maintain flow through the gap from either or from both the upper and lower directions.

A precision workpiece table 14 is included in the machine tool. The table 14 typically has a programmable travel table along both the X and the Y axis. The system for driving the table 14 generally includes precision preloaded ball bearing lead screws (not shown) which are effective to eliminate backlash. A four-sided work pan 15 surrounds the work area to contain the dielectric fluid. The table 14 also includes a work holding fixture 16 which is preferably quick clamping and capable of fastening workpieces of various sizes securely in place.

The machine column is indicated generally by the numeral 18, and includes a height adjustable head 19 which is adjustable through an associated precision rack and gear arrangement to bring the wire guide system close to the workpiece to maintain accuracy.

Figure 2:
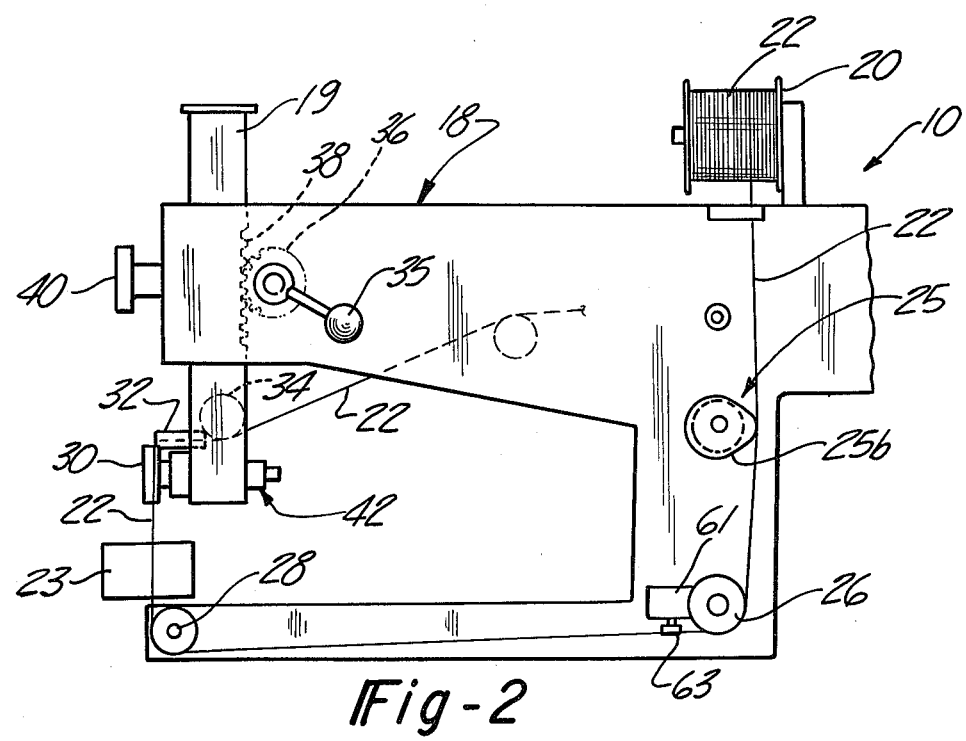
FIG. 2 is a right side elevational view of the machine tool head of FIG. 1.

The wire electrode system includes a supply reel 20 from which is unwound the electrode wire 22. The electrode 22, while it is illustrated as being of a wire configuration, may alternately be a band electrode with appropriate changes to be made known in the configuration of the associated guide and drive rollers. Guide rollers 26, 28, 30, 32, 34 are included in the system as shown in FIGS. 1 and 2 to carry the electrode 22 through a predetermined cutting path. The system further includes a variable tension brake 25 with a precisely controllable tension adjust system including switches 25a. A constant tension is maintained on the electrode wire 22 by the brake 25. The brake 25 is preferably of the adjustable torque, permanent magnet type and movement of the switches 25a causes tension adjustment, for example, in the range from 0.1 to 8.0 ounces by varying the magnetic flux. In the interest of brevity and simplification, the full detail of the parts of the brake 25 is not shown.

FIG. 2 shows in greater detail the arrangement of the wire 22 relative to the tension brake 25. The wire 22 is wound with one or two turns clockwise or counterclockwise about the capstan 25b of the tension brake 25. At the forward end of the head 18, the electrode 22 takes an upward path about the periphery of the roller 28, then passing about the periphery of the roller 30. It is significant that the rollers 28 and 30 have their axes of rotation orthogonal one to the other. This serves to greatly improve and insure the alignment accuracy which may be made in the vertical plane for the portion of the electrode 22 which is typically maintained in cutting proximity to the workpiece 23. The workpiece 23 is shown in the position in which it would be maintained and supported by the table 14.

The electrode 22 next passes about the roller 32 which again has an axis of rotation orthogonal relative to the axis of the roller 30. Also shown in FIG. 2 is the lever 35 which through a precision rack and gear assembly, including pinion gear 36 and rack 38, is used to allow vertical adjustment of the head assembly 19. A locking screw 40 is provided to hold the head assembly 19 securely in place after its height adjustment has been selected. Also shown in FIG. 2 is a portion of the spindle assembly 42 which is used to make linear adjustment of the roller 30 along the Y axis. A further spindle is included cooperative with the roller 28 to provide for its adjustability along the X axis as will be better shown in FIGS. 5 and 6 hereinafter.

Figure 3:
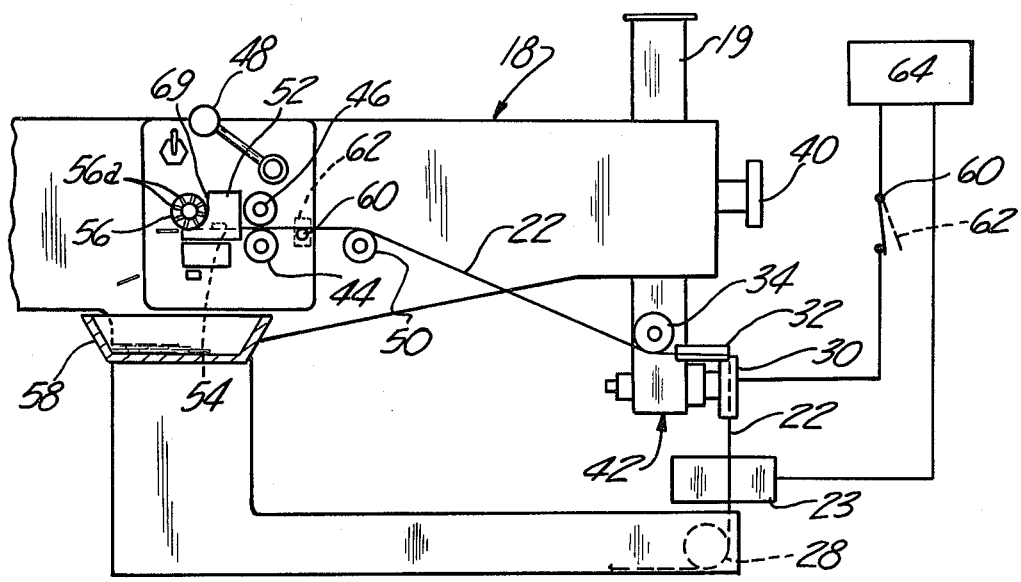
FIG. 3 is a left side elevational view of the machine tool head of FIG. 1 showing the electrical circuit portion of the protection system.

FIG. 3 shows the remainder of the electrode wire support and guidance system and the driving roller system therefor. The driving roller system includes a lower driven roller 44 and an opposed idler roller 46. The roller 46 is connected through a suitable intermediate gear mechanism to a lever 48 which is selectively moved to engage or disengage from operative position the roller 46. Next, adjacent the rollers 44 and 46, is a forwardly spaced guide roller 50 and a following cutter arrangement including an anvil 52 having a central channel 54 bored through it for threading therethrough the electrode wire 22. The left hand end of the anvil 52 is shaped with a circular or flat cut-out portion 69 to accommodate a rotary cutter 56. The cutter 56 is rotated at a predetermined rate to provide cut-off of segments from the used wire 22, thus to drop it in easily disposable form into a lower tray or receptacle 58. It will be seen that the rotary cutter 56 includes a number of cutting tips 56a which are sequentially engageable with the wire 22 as it exits from the feed system. The adjustment of the cut-off lengths of the wire 22 may be made by suitable adjustment of the speed of rotation of cutter 56. The pair of electrical drive motors associated with the cutter 56 and the driving roller 44 may be of the DC type for providing ready adjustment of speed of rotation of both elements. With proper synchronization between the two motors, the cut-off of the used segments will proceed without interruption of the wire feed.

Also included in the FIG. 3 drawing is a protective system for interrupting the operation of the wire feed apparatus. The system includes an electrical switch 60 having its actuator 62 slidably abutting with electrode wire 22 as it passes between the roller 50 and the rollers 44, 46. FIG. 2 shows a like switch 61 near the beginning of the wire feed system with its actuator 63 positioned in slidable engagement with wire 22 just beyond the roller 26. Switch 61 has a similar function to that which will be described for switch 60. In the event the electrode wire 22 becomes broken or loses tension through bowing or uneven unwinding from reel 20, the switch actuator 62 will be moved into position to operate the normally closed switch 60, thus to interrupt the power from the associated power supply which provides machining power pulses to the gap. The power supply is shown in FIG. 3 in block form identified by the numeral 64. The output from the power supply 64 is passed to the electrode wire 22 and to the workpiece 23 so that the necessary machining power pulse initiation occurs as is well known in the EDM art. The switch 60 is illustrated as a normally closed switch and responsive to the movement to the moved position of actuator 62 the machining power pulses to the gap will be interrupted. The switch 61 may also be included in series with the power supply 64 to provide a similar disconnect function.

Figure 4:
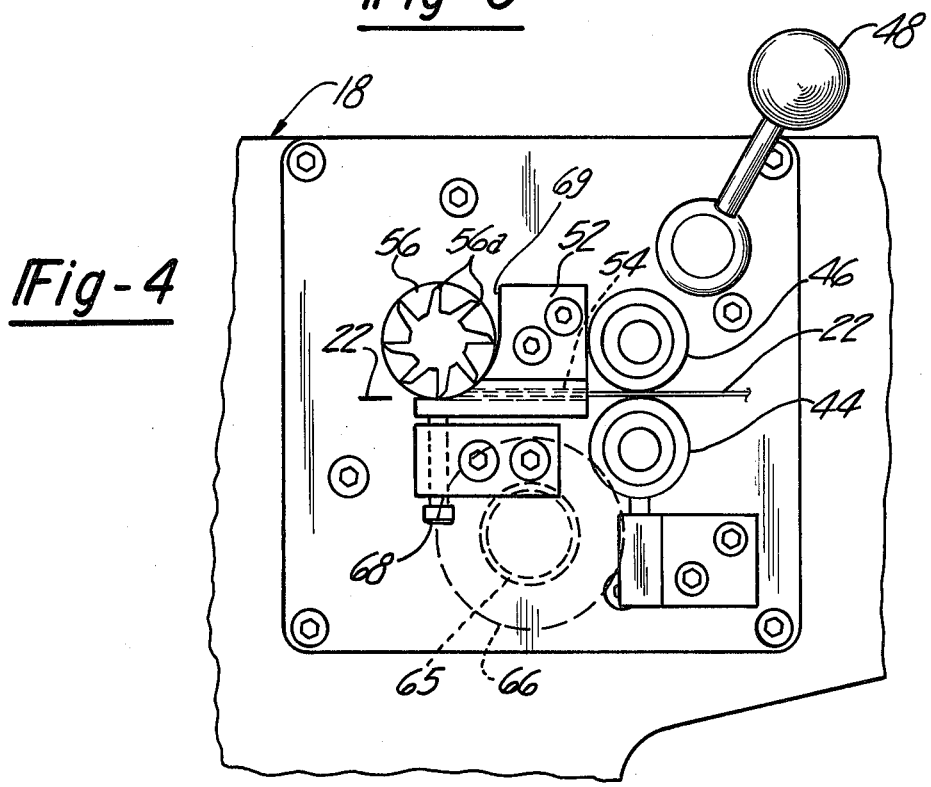
FIG. 4 is a view substantially similar to FIG. 3 but drawn to an enlarged scale to show better the detail of the cut-off Mechanism and the associated driven and idler roller arrangement.

FIG. 4 further shows the means used to provide a rotative drive to the gear cutter 56 and to the driven roller 44. A gear 65 is shown which is preferably coupled to the output shaft of an electrical drive motor 66. Through intermediate gear trains, not shown, the drive is passed from the gear 65 to the rotary cutter 56 and to the driven roller 44. Alternately, a separate drive means, such as a separate DC drive motor, may be provided for both the cutter 56 and for the roller 44 to operate them in synchronization. The lever 48 is coupled through a suitable intermediate mechanism to the upper idler roller 46 in such manner as to permit its rocking upward disengagement away from the roller 44 so that the wire 22 may be threaded into the passage 54 of the anvil block 52. Suitable adjusting screws, such as adjusting screws 68, are included to allow for adjustment of the anvil 52 and its radially curved or flat portion 69 so that the proper cutting relationship may be maintained between the cutting edges 56a and the curved or flat cut-out portion 69 to insure complete severance of each section from the wire 22.

Figures 5, 6:
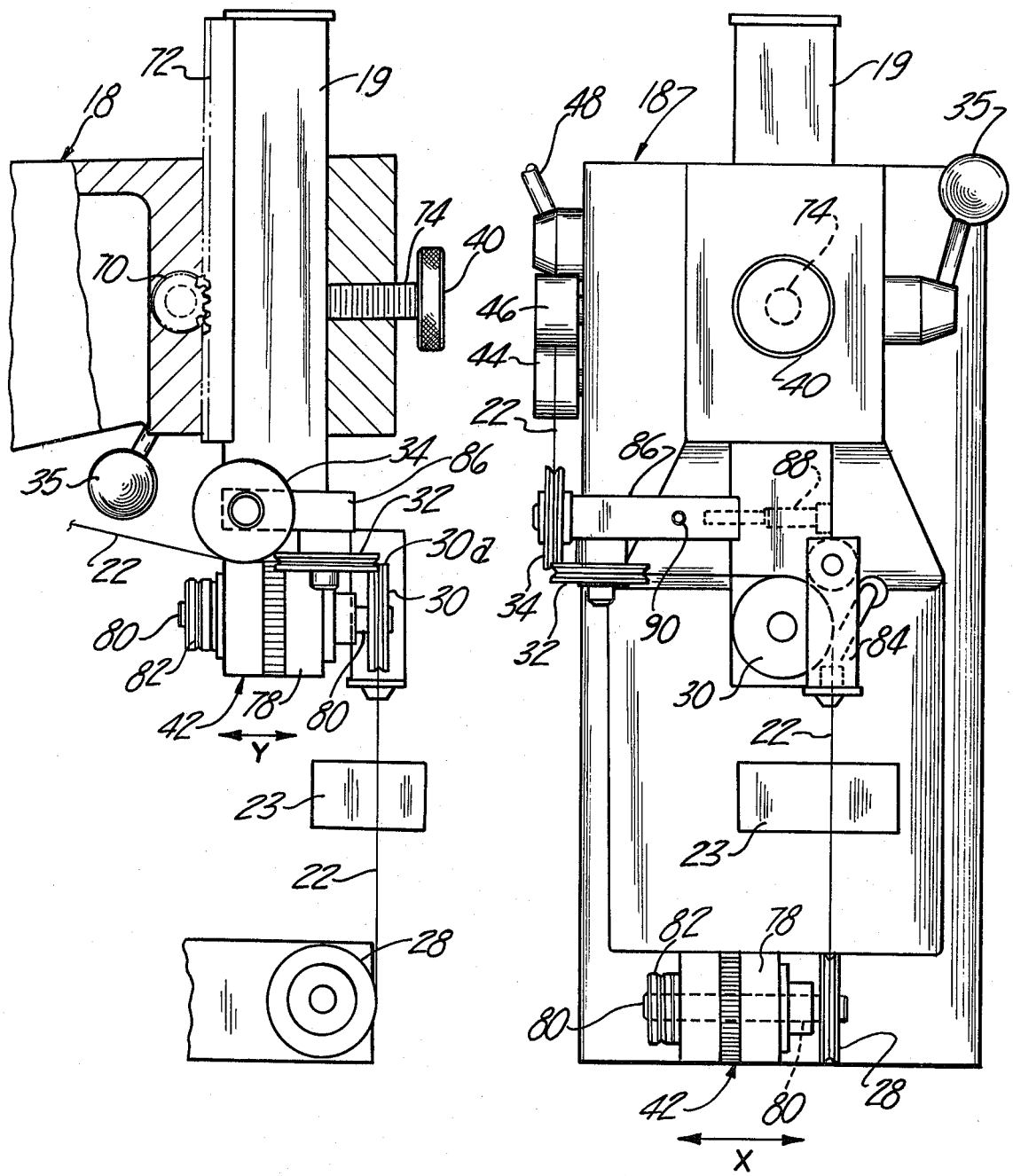
FIGS. 5 and 6 are enlarged scale, partially sectional views taken from the side and from the front of the machine tool head to better illustrate the parts used in the wire support and drive system.

FIG. 5 is shown partly in section to clarify the manner in which the head assembly 19 is vertically adjusted through the operation of the lever 34. The lever 34 rotates the pinion gear 70, which is in mesh with the rack gear 72 formed on the opposed surface of the head 19. In this manner, the height of the head 19 may be adjusted when necessary by the operator. A locking screw 74 is included which may be manually tightened to hold the head 19 in the selected vertical position.

Also shown in FIG. 5 is a detail of the mechanism used to provide adjustment in the Y axis of the roller 30 which is located proximate the upper surface of the workpiece 23. In the interest of simplicity, the FIG. 1 showing of the two transverse X and Y axial tables is not repeated. It is, of course, necessary that there be a precise adjustment in a vertical direction of the wire 22 preliminary to the cutting operation. It will be seen also that the roller 30, like the other rollers used in the wire feed system, includes a V-type cut-out portion 30a to suitably retain the wire 22 in place as it passes over the roller. The spindle which mounts the roller 30 for selective adjustment along the Y axis is indicated generally by the numeral 42. The spindle 42 includes a central housing 78 and a central shaft 80 threaded and adapted to receive at its left hand end a lock nut 82. The guide roller 30 and the shaft 80 on which it is rotatably mounted are movable longitudinally with the housing 78, either to the right or to the left, and when the proper position is selected, the lock nut 82 is tightened to secure the assembly in place. Also shown is the roller 32 which next receives the wire 22 from about the periphery of the roller 30 and passes it forward in the system as previously illustrated. At the lower right hand portion of the FIG. 5 drawing, there is shown the roller 28 which is mounted in a rotatable manner proximate the lower surface of the workpiece 23.

FIG. 6 shows the detail of the manner in which the roller 28, which is disposed near the lower surface of the workpiece 23, is mounted. The spindle assembly 42 is substantially the same as the one already shown in FIG. 5 and used in connection with the roller 30. It will thus be seen that the roller 28 is selectively movable leftwardly or rightwardly along the X axis so that it is possible to make a precise vertical adjustment of the wire relative to the workpiece 23. It is significant that the axes on which rollers 28 and 30 are rotatably mountable are positioned orthogonal one to the other. This positioning greatly assists in initially setting and in maintaining the vertical alignment which is so critical to accurate machining of the workpiece 23. Also shown in FIG. 6 is a portion of the cartridge 84 which serves as a further guide to the wire 22. The guide roller 34 will be seen to be mounted on a shaft 86 which itself is adjustable leftwardly through the operation of a threaded adjusting screw 88. The final exiting of the electrode wire 22 is between the opposed surfaces of the driving roller 44 and the driven roller 46 shown in the upper left hand corner of the FIG. 6 drawing.

It will thus be seen that the present invention provides a novel and greatly improved system for mounting and guiding a wire elecrode on a machine tool for electrical discharge machining. The elements used to maintain the continuous path of the wire electrode relative to the workpiece are arranged to make its adjustment precise, particularly in the area of the workpiece opposed portion. The entire system includes a single reel, such as supply reel 20, and the means for providing a constant velocity movement of the electrode wire incorporates positive driving as between the driving and driven roller through an electrical motor drive. In this way, it is possible to virtually eliminate the wire bend and distortion problem which might interfere with the accuracy of the wire cutting EDM operation.

What is claimed is:

1. An electrical discharge machining apparatus which provides machining of a workpiece by means of a conductive wire for the electrode mounted on a head, comprising;
   a supply reel for the wire mounted on the head in a freely rotatable manner;
   a plurality of guide rollers for retaining and transporting said wire in a predetermined path to provide a cutting pass and translational movement relative to the workpiece;
   said guide rollers including a separate pair of orthogonal axis guide rollers, respectively, positioned proximate opposite sides of the workpiece;
   a drive motor;
   a pair of opposed rollers, one driven by said drive motor and the other idle, biased one against the other to engage and provide a constant and uniform pulling force upon the wire as machining progresses; and
   a switching means having its actuator in sensing abutment relative to said wire at a point intermediate said opposed rollers and the last of said guide rollers proximate thereto, said switch operable to interrupt power to said drive motor responsive to loss of tension of the wire at said point.

2. The combination as set forth in claim 1 wherein there is provided a separate means operably connected to said driven opposed roller for raising it from engagement with said opposed idle roller to provide rethreading of said electrode wire after breakage thereof.

3. The combination as set forth in claim 1 wherein an independent source of machining power pulses is operably connected across the workpiece and electrode gap and wherein said switching means is further operably connected to and effective to interrupt the connection of said machining power source to the gap responsive to the loss of tension of said wire.

4. The combination as set forth in claim 1 wherein a second switching means is mounted on said head proximate the wire at the point it is being removed from said supply reel, said second switching means having its actuator in sensing contact with said wire for responding to loss of tension of said wire and interrupting said power.

* * * * *